H. WERNER.
Self-Acting Dams.
No. 135,023. Patented Jan. 21, 1873.
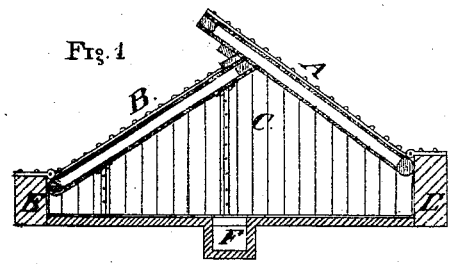
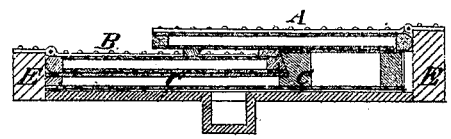
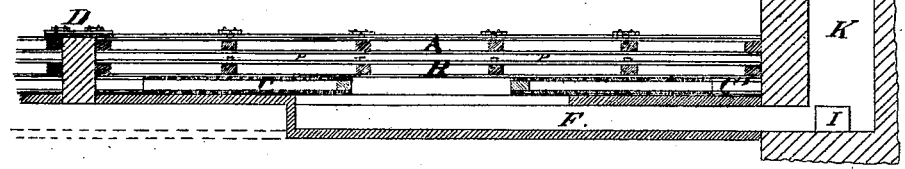
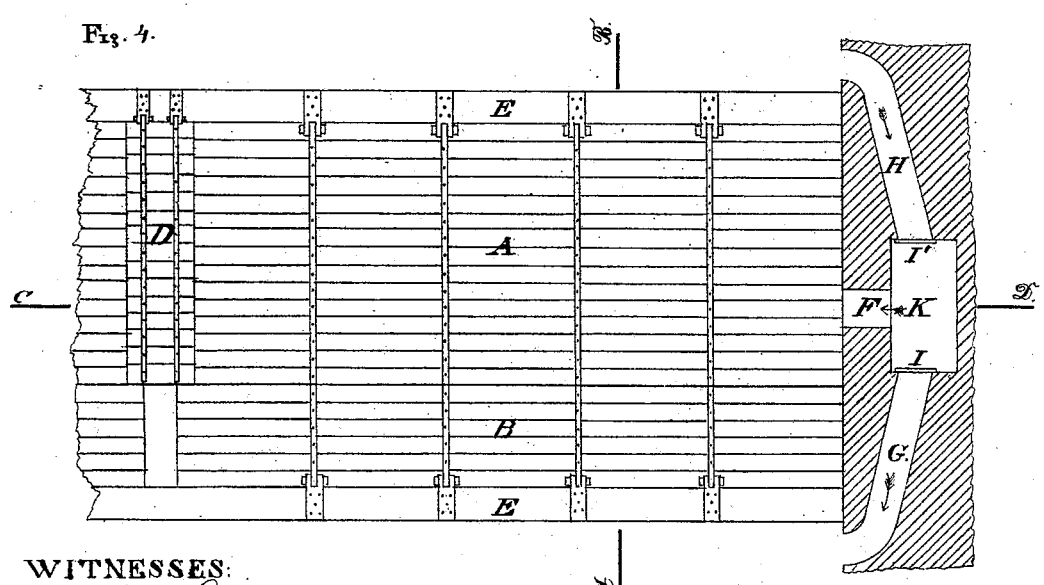
WITNESSES:
Geo R Eichbaum
Philip Schopp
INVENTOR:
Herman Werner 2 Sheets--Sheet 2.
H. WERNER.
Self-Acting Dams.
No. 135,023.  Patented Jan. 21, 1873.
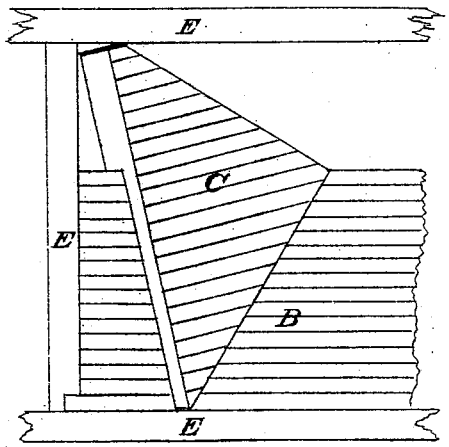
Fig. 6.
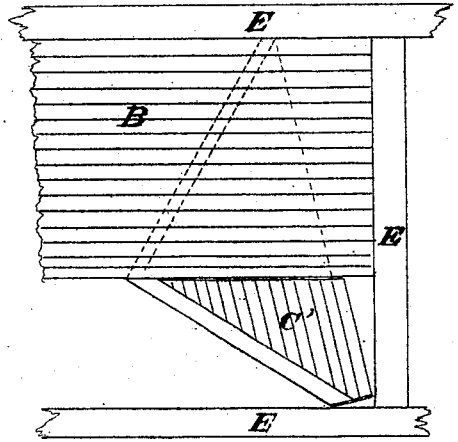
Fig. 5.
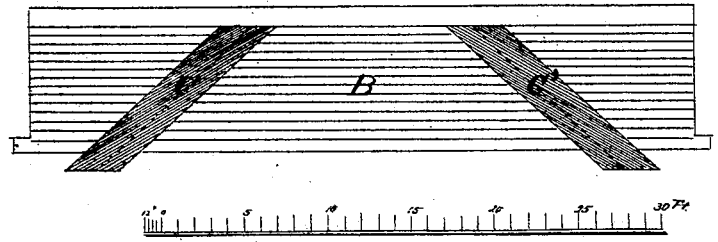
Fig. 7
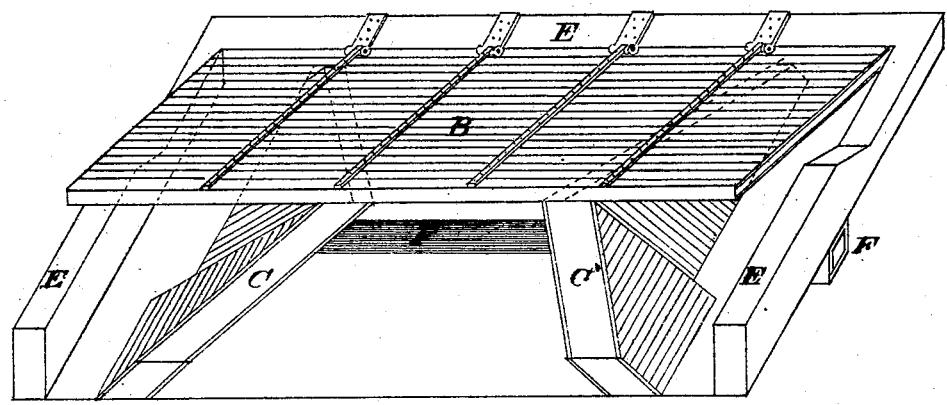
Fig. 8.    Scale
WITNESSES:
Geo. R. Eichbaum
Philip Schopp
INVENTOR:
Herman Werner

UNITED STATES PATENT OFFICE.

HERMAN WERNER, OF LOUISVILLE, KENTUCKY.

IMPROVEMENT IN SELF-ACTING DAMS.

Specification forming part of Letters Patent No. 135,023, dated January 21, 1873.

*To all whom it may concern:*

Be it known that I, HERMAN WERNER, of Louisville, in the county of Jefferson and State of Kentucky, have invented certain Improvements in Movable Dams, of which the following is a specification:

My invention relates to the combination of two additional cross-wings to the already known self-acting, so-called, flood-dam, by which arrangement the dam may be built in sections.

The principal wings of the dam are supported by the column of water let into it by an underground channel, and the escape of the water is prevented by the two cross-wings, which rise and fall with the principal ones, and are firmly pressed against them by the pressure of the water. Without such an arrangement, the successful application of the construction for a large opening would be very doubtful.

Figure 1 is a vertical transverse section on line A B, showing the dam in an elevated position for low water. Fig. 2 is a vertical transverse section on line A B, showing the dam in a horizontal position for high water. Fig. 3 is a vertical longitudinal section on line C D. Fig. 4 is a plan of the wings and a horizontal section through the abutment, showing inlet and outlet culverts and culvert under dam. Fig. 5 is a plan, showing part of one of the principal wings and cross-wings under it. Fig. 6 is a plan of the cross-wings as seen from below. Fig. 7 is a vertical longitudinal section through the two elevated cross-wings, and a view of one of the principal wings. Fig. 8 is an isometrical projection with one of the principal wings removed.

A and B are the two principal wings of the structure. They are strongly built to resist the pressure, and fastened by means of hinges to heavy timber or stone foundation. They are so arranged that wing A overlaps wing B. In the usual way, where openings of small dimensions are to be closed, these wings abut against two permanent abutments. This, however, would be impracticable where a free navigable space of several hundred feet is required. For firm abutments I substitute two cross-wings, C and C', under the two principal ones. These cross-wings are fastened to the principal wing B by hinges, or they may be so arranged as to move on pivots. Elsewhere they are loose. They are so constructed and set as to shut closely against the principal wings in any state of elevation, and are raised and sunk simultaneously with the principal wings A and B. They should be constructed of sound strong timber.

The operation is now as follows: At high water, when vessels should pass over a dam, wings A and B are laid down or rest in a horizontal position. At low water, when a certain depth must be kept for navigable purposes, the dam is raised. This is done by opening the wicket or sluice gate I', Figs. 3 and 4, and letting the water run through the inlet-culvert H into the fore-bay K, and then by culvert F under the four wings A B C and C'. The wings A and B, by means of hydrostatic pressure under them, will rise, and with them wings C and C'. This upward movement and influx of water will continue until wing B is stopped by a cross-piece, p, fastened to wing A. As the four wings close tightly against each other, the water cannot escape in considerable quantities, and will act as a support against the outside pressure of the overflowing column of water. When the dam shall be lowered, the sluice-gate I' is shut and gate I opened, so that the water may flow out through the outlet-culvert G, and the wings A and B being without support against outside pressure will lower and take their horizontal position.

E is a part of the foundation. D is a piece of timber to cover the opening left between two sections.

I claim as my invention—

The combination of the cross-wings C and C' with the principal wings A and B, substantially and for the purpose hereinbefore set forth.

HERMAN WERNER.

Witnesses:
 GEO. R. EICHBAUM,
 PHILIP SCHOPP.